United States Patent
Danneels et al.

(10) Patent No.: US 6,571,339 B1
(45) Date of Patent: May 27, 2003

(54) USE OF A PROCESSOR IDENTIFICATION FOR AUTHENTICATION

(75) Inventors: Gunner D. Danneels, Beaverton, OR (US); Peter A. Nee, Beaverton, OR (US); Sameer Kalbag, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/223,447

(22) Filed: Dec. 30, 1998

(51) Int. Cl.[7] .......................... G06F 11/30; G06F 17/60; H04L 9/00
(52) U.S. Cl. ...................... 713/201; 713/155; 713/156; 713/161; 713/172; 705/56; 705/57; 705/58; 705/65
(58) Field of Search ................. 713/200, 201, 713/155, 161, 156, 185, 172, 154; 705/56, 57, 58, 65, 26

(56) References Cited

U.S. PATENT DOCUMENTS

| | | | | |
|---|---|---|---|---|
| 5,619,657 A | * | 4/1997 | Sudama et al. | |
| 5,774,544 A | * | 6/1998 | Lee et al. | |
| 5,790,664 A | * | 8/1998 | Coley et al. | |
| 5,790,783 A | * | 8/1998 | Lee et al. | |
| 5,946,497 A | * | 8/1999 | Lee et al. | |
| 5,991,413 A | * | 11/1999 | Arditti et al. | |
| 6,067,582 A | * | 5/2000 | Smith et al. | |
| 6,070,243 A | * | 5/2000 | See et al. | |
| 6,157,920 A | * | 12/2000 | Jakobsson et al. | |
| 6,263,446 B1 | * | 7/2001 | Kausik et al. | |
| 6,289,459 B1 | * | 9/2001 | Fischer et al. | |

OTHER PUBLICATIONS

Gale Group, Intel Adds Security Features to Future Chips, Jan. 22, 1999.*
Stallings William, Network and Internetwork Security, 1995, Prentice–Hall, Inc., p. 315, 318.*
Wilson, Keeping Tabs on Lan Links, Jan. 1995, p. 1.*
Nibeletto, Digital Ceritificates Scale Down to SMS's, Mar. 2001, p. 1–2.*
Williams, Internet Update, Jun. 1998, p. 32.*

* cited by examiner

Primary Examiner—Norman M. Wright
Assistant Examiner—Jenise Jackson
(74) Attorney, Agent, or Firm—Schwegman, Lundberg, Woessner & Kluth, P.A.

(57) ABSTRACT

A system comprises a first computer which has a unique processor identification. Additionally, a first application is operatively coupled to the first computer across a network. The first computer provides the unique processor identification to the first application with the first application identifying the first computer based on the unique processor identification.

41 Claims, 8 Drawing Sheets

USE OF A PROCESSOR IDENTIFICATION FOR AUTHENTICATION

FIELD

The present invention relates to use of a processor identification and, in particular, to use of a processor identification for authentication across a network.

BACKGROUND

System identification, is self-defined as a way to uniquely identify a particular system (e.g., a computer). Two examples of the use of system identification include asset tracking and network (e.g., Internet) authentication. Currently in order to perform asset tracking or inventory control of systems, such as computers, different solutions have been implemented. One solution is the use of asset tags attached to each asset. Persons with hand-held scanning devices physically visit the different sights where the assets are located to scan in the asset tag for tracking each asset. The problem with the use of asset tags, however, is that these tags can be easily removed and/or switched and persons have to physically visit each asset location to perform the asset tracking.

Another solution is the assignment of addresses over a network using a global database. This database assigns a unique address to some software module running locally on the particular machine being given the unique address. This solution, however, assumes that the machine is running at the time of the address assignments and that the software is untampered. One other solution is the placement of a peripheral card (e.g., a network interface card) inside a computer which includes a network card address. This allows remote asset tracking over a network using this network card address. The problem with the use of a network interface card, however, is that these cards are relatively easy to switch out as they are typically changed throughout the life of a computer.

System identification is also used for network authentication. For example, the Internet provides the ability to reach a large number of customers for post-purchase communication. Recent developments for web sites on the Internet have seen the creation of owner's clubs allowing the target-marketing to members of a club which can include offers of substantial value (e.g., free software and books). Through cross-company agreements, these owner's clubs can include multiple companies. For example, buying merchandise from one company's web site can allow for free merchandise from a different company through this different company's web site.

Currently, owner's clubs use cookie files which are an Internet browser feature whereby Internet web sites record information about the computer user on the computer user's local computer. On subsequent visits by the computer user upon validation of this information, the web site allows the computer user to access the web site. Using these cookie files, members of these owner's clubs are immediately recognizable on return to that particular club web site. Cookie files, however, are limited in that they are not sharable across affiliate sites as all of the club web pages would have to be in the same domain of the Internet to allow the cookie files to reside in a database accessible by all the affiliate web sites. Having affiliate web sites in different domains of the Internet precludes this common accessibility to the cookie files.

One current solution to this limitation is to have the club web site pass its authenticated users off to the affiliate web site. This solution, however, requires that the club members log in to the main club site first, not allowing them to go directly to the affiliate web site.

Moreover, a second limitation involving these cookie files are the inherent security concerns associated therewith as these files can be copied to other machines for other users. Because of this lack of security, the cookie is often coupled with a user name and password. This information can be lost and/or easily forgotten and contains its own set of security issues. Credit card numbers have been used to transfer valuable items.

Additionally, peripheral devices are currently being attached to personal computers to account for some of the aforementioned shortcomings of cookie files. These devices allow a user to enter confidential data (e.g., a Personal Identification Number (PIN)) which is thereafter encrypted by the peripheral module before transmitting the data across the Internet. These solutions involving peripheral devices, however, require additional costs for hardware for a user's personal computer. Therefore, for these and other reasons there is a need for the present invention.

SUMMARY

In one embodiment, a system includes a first computer having a unique processor identification. Additionally, a first application is operatively coupled to the first computer across a network. The first computer provides the unique processor identification to the first application with the first application identifying the first computer based on the unique processor identification.

DETAILED DESCRIPTION OF EMBODIMENTS

In the following detailed description of the exemplary embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention. For sake of clarity, the numbering of elements across the different figures will be uniform for those elements which coincide.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The following description includes the terms agent and digital wallet, which, in one embodiment, are defined generally as software modules or scripts being downloaded from one system to another to be executed on the latter. Additionally, a digital wallet is used to limit the distribution of digital membership cards to those verified club affiliates through the below-described public/private key mechanism.

Figure 1:
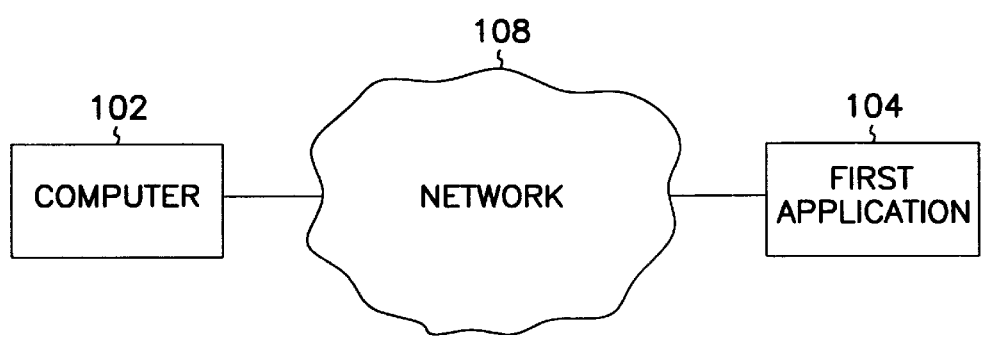
FIG. 1 is a block diagram of a system in accordance with an embodiment of the invention.

FIG. 1 is a block diagram showing how a computer employed in the invention can be connected to a network. The system of FIG. 1 includes computer 102, first application 104 and network 108. The invention adds to computer 102 a processor which includes a unique processor identification. In one embodiment, this unique processor identification is a unique number tied to or associated with an individual processor on a computer such that, but for possible processor manufacturing errors, no two processors have the same processor identification. In another embodiment, the processor is a central processing unit (CPU). Network 108 is a network which is defined as a group of two or more computer systems linked together. Examples of networks include local area networks (LAN) and wide area networks (WAN) or the Internet.

Computer 102 is operatively coupled to first application 104 through network 108. Computer 102 includes a unique processor identification associated with its particular processor. Computer 102 provides this unique processor identification associated with the processor of computer 102 to first application 104 through network 108 allowing first application 104 to identify computer 102 based on the unique processor identification.

Figure 2:
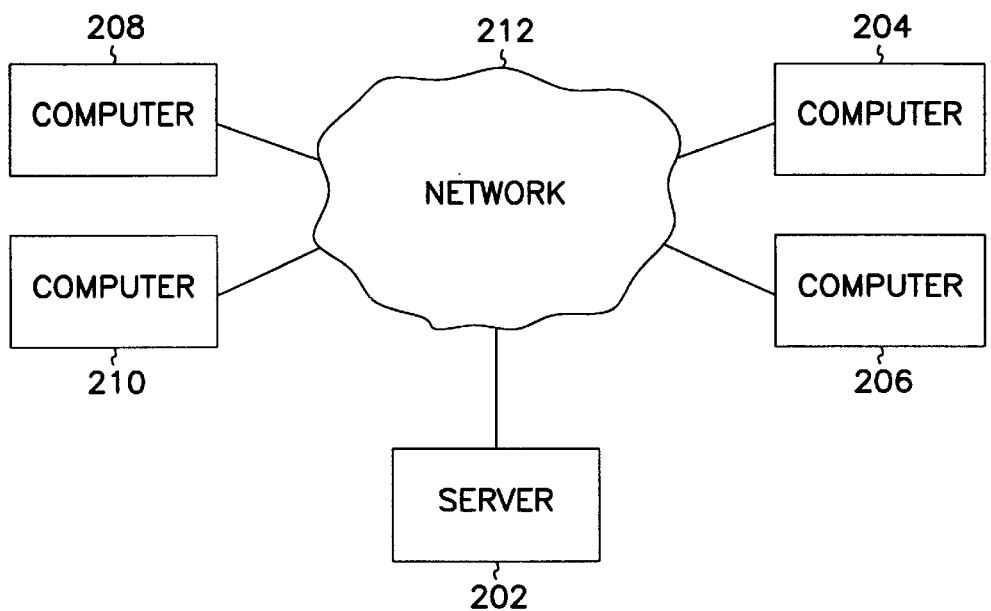
FIG. 2 is a block diagram of a system in accordance with another environment in which the invention may be practiced.

FIG. 2 is a block diagram showing how multiple computers can be connected to a server for use in the invention.

The system of FIG. 2 includes server 202, computer 204, computer 206, computer 208, computer 210 and network 212. FIG. 2 illustrates only one server and four connecting computers; however, the invention is not so limited. More servers and computers may be added to the configuration of FIG. 2, but has been limited for sake of clarity. Server 202 is operatively coupled to computer 204, computer 206, computer 208 and computer 210 through network 212. Computer 204, computer 206, computer 208 and computer 210 includes unique processor identifications associated with their particular processors allowing them to uniquely identify themselves.

Figure 3:
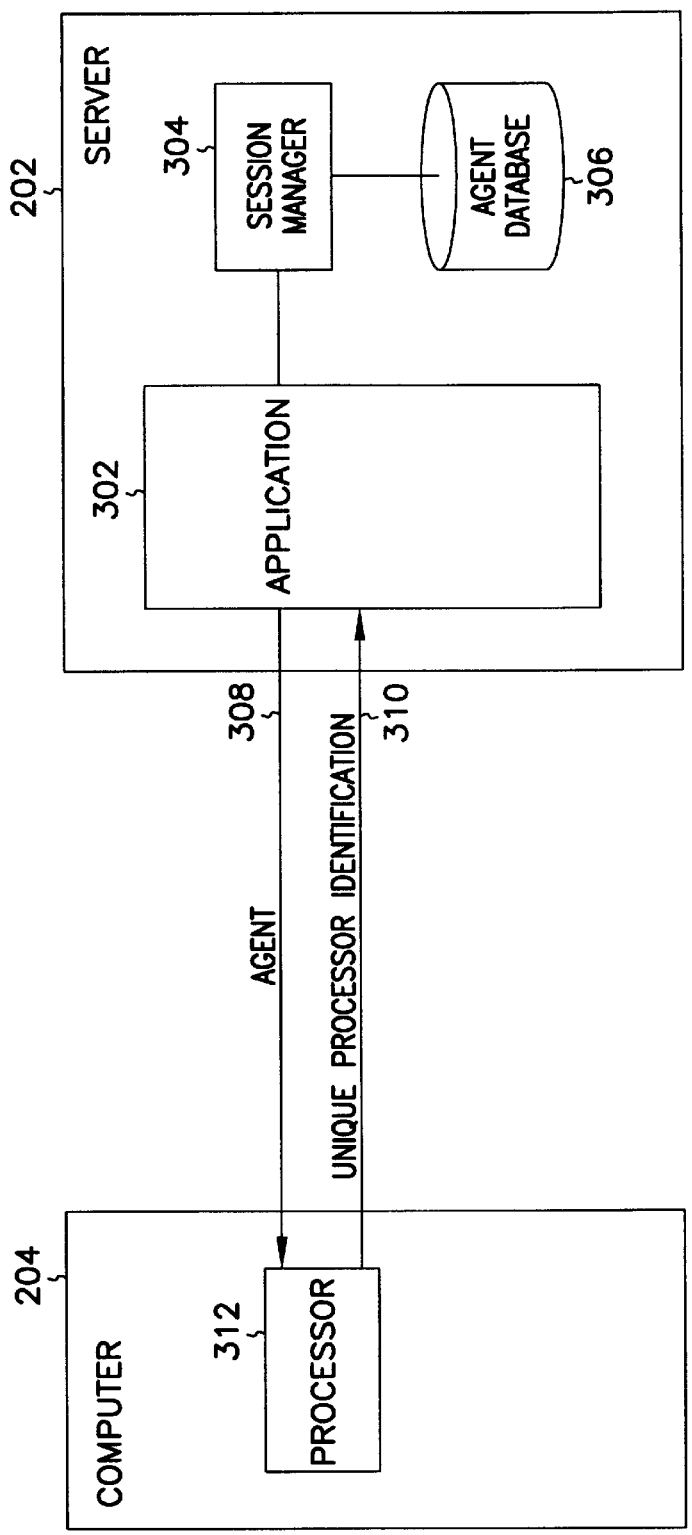
FIG. 3 is a diagram of an identification process for use with an embodiment of the invention.

FIG. 3 is a diagram of one embodiment of this identification process that can be employed in the present invention. FIG. 3 includes one of the computers and the server from FIG. 2 to illustrate this process. In particular, FIG. 3 includes server 202, computer 204, and additionally includes application 302, session manager 304, agent database 306, agent 308, unique processor identification 310 and processor 312. In one embodiment, agent 308 is a software module that accesses unique processor identification 310 and transmits it back to server 202. In one embodiment, application 302, session manager 304, agent database 306 reside on server 202. In another embodiment, processor 312 resides on computer 204. Using agent database 306, session manager 304 through application 302 sends agent 308 to computer 204. In one embodiment, agent 308 is a software module or script that accesses unique processor identification 310 from processor 312 of computer 204 by executing a supervisory instruction from a set of instructions on computer 204 to provide unique processor identification 310 to application 302. From computer 204, agent 308 digitally signs and sends unique processor identification 310 back to session manager 304 through application 302.

A digital signature is used in public-key cryptography, which is a method used on networks (e.g., the Internet) to maintain secure communications. To use this form of cryptography, a computer user must have a pair of cryptographic keys (a public key and a private key) which are long strings of bits (data). The computer user make the public key available to other users that the computer user desires to communicate, while maintaining the private key in a secure location.

Applying this embodiment of cryptography to the aforementioned use of a digital signature by agent 308, session manager 304 is provided the public key for agent 308. Applying a mathematical formula (e.g., a hash function) to a message which includes unique processor identification 310, agent 308 creates a message digest. Agent 308 then encrypts the message digest with its private key to create the digital signature. Agent 308 sends this message along with the digital signature to application 302.

Subsequently, using the public key from agent 308, session manager 304 decrypts the digital signature which provides the original message digest sent from agent 308. Session manager 304 then applies the hash function to the message and compares the message with the message digest to verify that they are the same. Once this verification is complete, session manager 304 is assured that this message containing unique processor identification 310 is free from tampering and is from agent 308. Therefore, because the private key of agent 308 is being sent with agent 308 across to computer 204 and because of the dependency of session manager 308 that this message is secure, agent 308 and its private key must be secure because access to its private key allows someone to create of a false message. In one embodiment, security of the private key is provided by tamper-resistant software. In another embodiment, a particular private key is sent (used only once), and a response must be given by agent 308 within a certain time frame (e.g., 10 seconds) or the response is not accepted. This limited time frame precludes someone having sufficient time to intercept the private key and use it to send a false message. Session manager 304 then validates computer 204.

Figure 4:
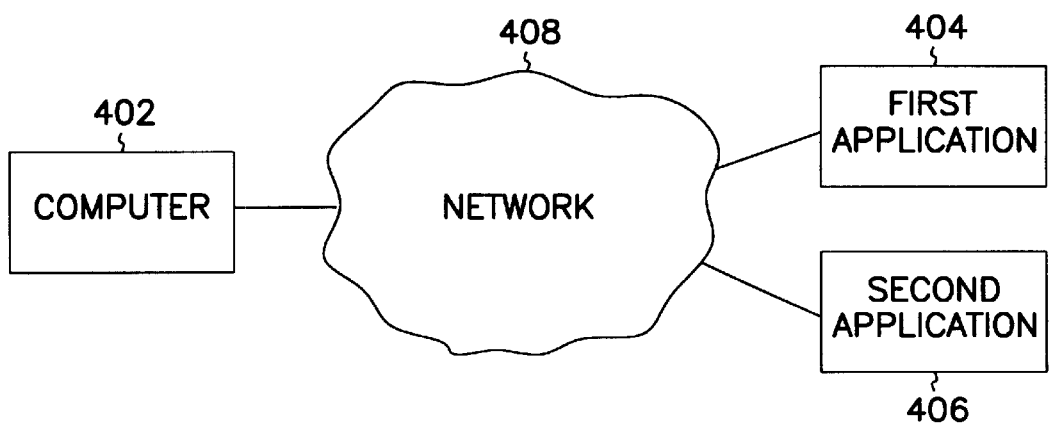
FIG. 4 is a block diagram of a complete environment for hosting an embodiment of the invention.

FIG. 4 is a block diagram of a complete environment for hosting an embodiment of the system of FIG. 1. The system of FIG. 4 includes computer 402, first application 404, second application 406 and network 408. Computer 402 has a processor which includes a unique processor identification. In one embodiment, this unique processor identification is a unique number tied to or associated with an individual processor such that no two processors have the same processor identification. In another embodiment, the processor is a central processing unit (CPU). Network 408 is a network which is defined as a group of two or more computer systems linked together.

Computer 402 is operatively coupled to first application 404 through network 408. Computer 402 includes a unique processor identification associated with its particular processor. Computer 402 provides this unique processor identification associated with the processor of computer 402 to first application 404 through network 408 allowing first application 404 to authenticate the unique processor identification of computer 402.

Figure 5:
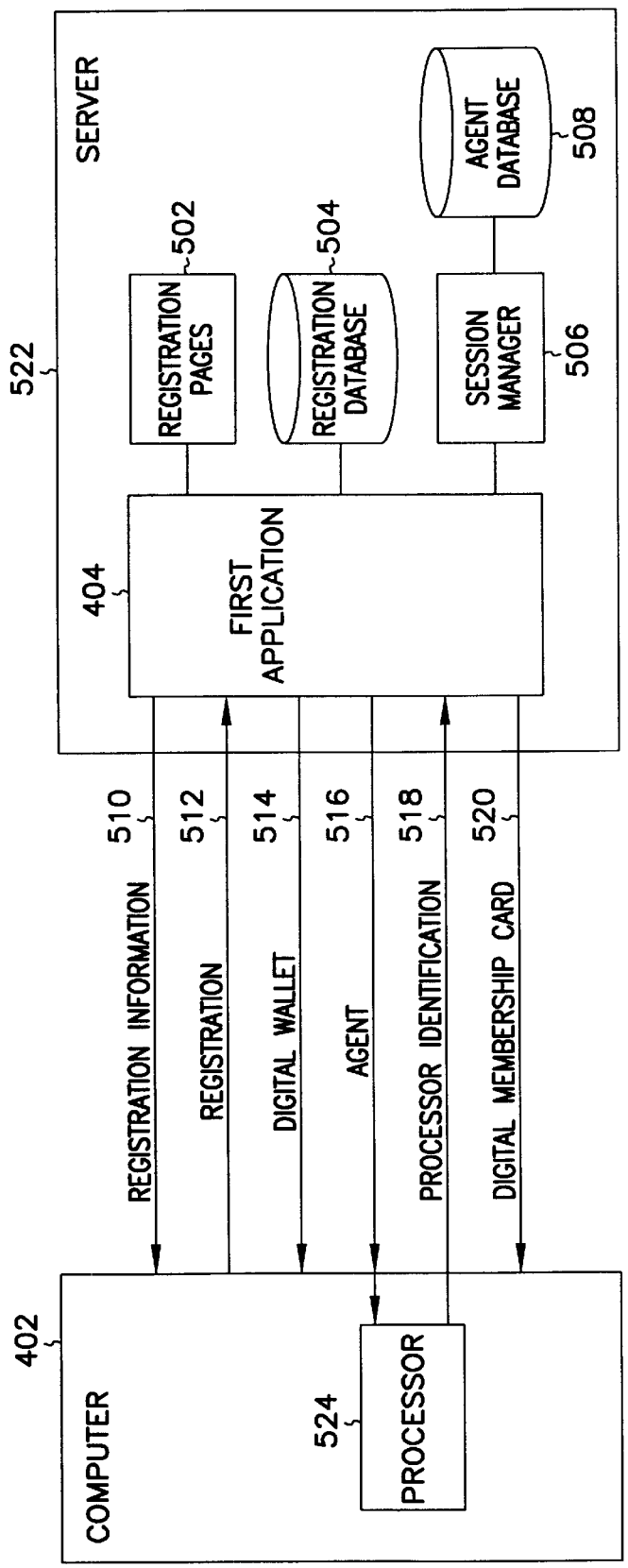
FIG. 5 is a diagram of a process in accordance with another embodiment of the invention.

FIG. 5 is a diagram of this authentication process in accordance with an embodiment of the invention. In particular, FIG. 5 illustrates an embodiment of the present invention wherein the unique processor identification for a computer is used for security validation across a network. One example of this security validation would involve Internet clubs across multiple web sites on the Internet. These clubs provide their members the advantages involved with cross-company agreements including free and discounted merchandise from one company's web site based on the buying of merchandise from another company's web site. The use of a computer's processor identification provides a secure mechanism through which these Internet clubs can be assured that these advantages and benefits of being a club member are being distributed to their members only.

FIG. 5 includes computer 402, processor 524 server 522, first application 404, registration pages 502, registration database 504, session manager 506, agent database 508, registration information 510, registration 512, digital wallet 514, agent 516, unique processor identification 518 and digital membership card 520. In one embodiment, first application 404, registration pages 502, registration database 504, session manager 506 and agent database 508 reside on server 522. In another embodiment, processor 524 resides on computer 402.

Using registration pages 502, first application 404 residing on server 522 formulates and sends registration information 510 to computer 402. Computer 402 receives registration information 510 from first application 404. A user of computer 402 completes registration 512 based on registration information 510 and sends registration 512 back to first application 404. First application 404 then inputs registration 512 into registration database 504. Subsequently, session manager 506 through first application 404 downloads digital wallet 514 to computer 402. In one embodiment, session manager 506 through first application 404 is a software module which monitors the session (i.e., the interaction) that first application 404 is having with a particular computer (e.g., computer 402). This monitoring includes which agents have been sent out to a particular computer (e.g., computer 402) and how long that a particular computer takes to respond a request (e.g., a request for the computer's unique processor identification). In one embodiment, digital wallet 514 is a software module which provides an environment for agent 516 to operate and also executes agent 516, thereby allowing access to unique processor identification 518 of computer 402 by agent 516.

Using agent database 508, session manager 506 through first application 404 sends agent 516 to computer 402. In one embodiment, agent 516 is a software module or script that accesses unique processor identification 518 from processor 524 of computer 402 by executing a supervisory instruction from a set of instructions on computer 402 to provide unique processor identification 518 to first application 404. From computer 402 using a digital signature, agent 516 sends unique processor identification 518 back to session manager 506 through first application 404.

Once verification is complete, application 504 is assured that this message containing unique processor identification 518 is free from tampering and is from agent 516. Subsequent to this verification of unique processor identification 518, session manager 506 downloads digital membership card 520 which, in one embodiment, is a file containing a unique membership number along with unique processor identification 518, both of which indicate (i.e., represent) the identity of computer 402. Additionally, digital membership card 520 and the unique membership number are signed with the private key of application 404 to demonstrate that they were generated by application 404.

Additionally, computer 402 is operatively coupled to second application 406 through network 408. Subsequent to registration with first application 404, computer 402 communicates with second application 406 through network 408 without communicating through or being transferred by application 404 (i.e., the communication between computer 402 and application 406 is independent of application 404).

Figure 6:
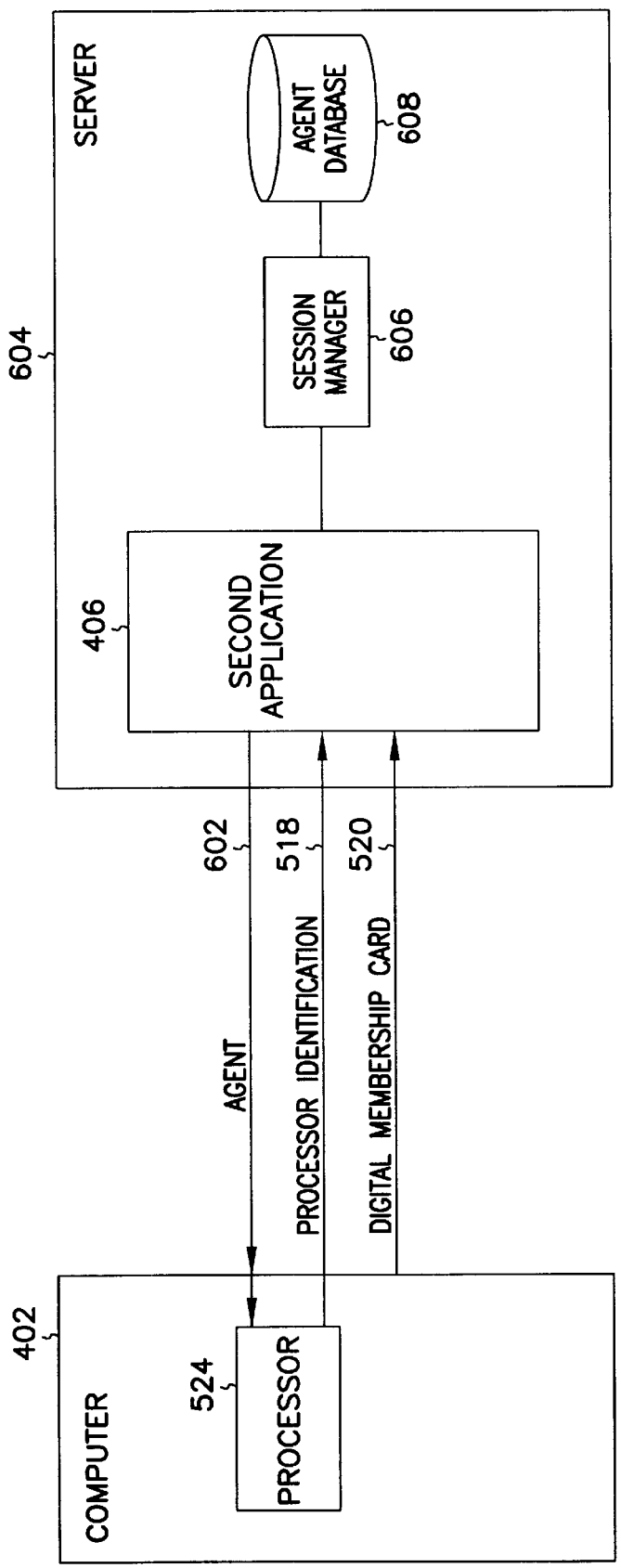
FIG. 6 is a digram of a process in accordance with another embodiment of the invention.

FIG. 6 is a diagram of this communication process between computer 402 and second application 406 in accordance with an embodiment of the invention. FIG. 6 includes computer 402, processor 524, server 604, second application 406, session manager 606, agent database 608, agent 602, unique processor identification 518 and digital membership card 520. In one embodiment, second application 406, session manager 606 and agent database 608 reside on server 604. In another embodiment, processor 524 resides on computer 402.

With digital wallet 514 already residing on computer 402 from the prior interaction with first application 404, session manager 606 sends agent 602 from agent database 608 through second application 406 to computer 402 to retrieve unique processor identification 518 from processor 524 of computer 402 along with digital membership card 520. Unique processor identification 518 is digitally signed by agent 602 and sent to second application 406. Second application 406 verifies that digital membership card 520 is valid by using the public key of application 404 and verifies that unique processor identification 518 has been signed by agent 602. Second application 406 then recognizes computer 402 and its user as a valid club member to enjoy the benefits therein.

Figure 7:
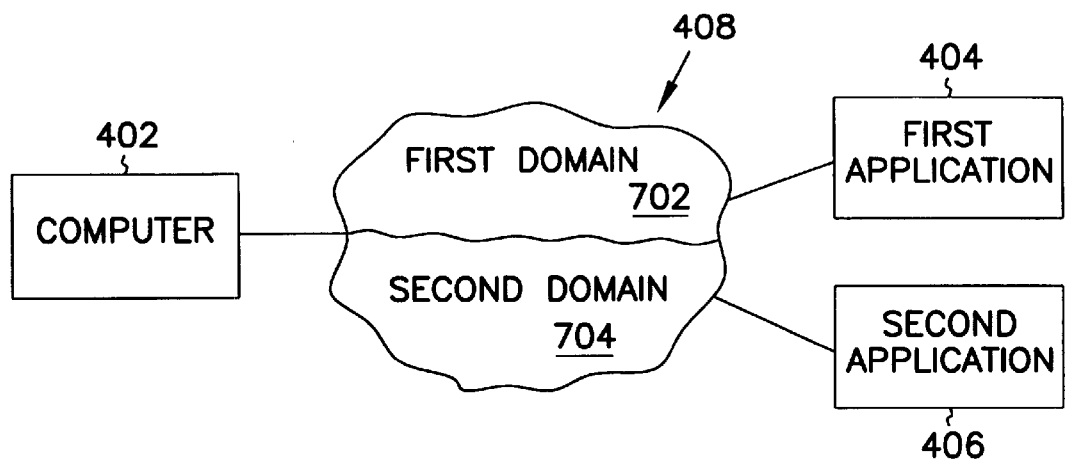
FIG. 7 is a block diagram an embodiment of the invention operating in the environment of FIG. 4.

FIG. 7 shows an example of the invention operating in the environment of FIG. 4. The system of FIG. 7 includes computer 402, first application 404, second application 406, network 408, first domain of 702 and second domain 704. First domain 702 and second domain 704 of network 408 are domains within a network which are defined generally as a group of computers and devices on a network that are administered as a unit with common rules and procedures.

As described for FIG. 4, computer 402 includes a processor which has a unique processor identification. In one embodiment, the processor is a CPU. Computer 402 is operatively coupled to first application 404 which resides in first domain 702 of network 408. Computer 402 registers with first application 404 through network 408 wherein first application 404 performs authentication of computer 402 based on the unique processor identification associated with the processor of computer 402. This authentication of computer 402 is consistent with the description for FIG. 5.

Additionally, computer 402 is operatively coupled to second application 406 which resides in second domain 704 through network 408. Subsequent to registration with first application 404, computer 402 communicates with application 406 through network 408. In one embodiment, this communication between computer 402 and second application 406 occurs without communicating through or being transferred by application 404 (i.e., the communication between computer 402 and application 406 is independent of application 404). Second application 406 validates digital membership card 520 and unique processor identification 518 through network 408, consistent with the description of FIG. 6.

In one embodiment network 408 is the Internet, which is a growing network globally connecting currently millions of computers and more than 100 million users to provide an information exchange using standardized communication protocols. In another embodiment, first application 404 is an Internet web site and in another embodiment, second application 406 is an Internet web site. An Internet web site is defined as a location on the World Wide Web (WWW), which is a system of Internet servers for communicating text, graphics and other multimedia objects supporting documents specially formatted in such languages as Hypertext Markup Language (HTML), described in RFC 1886, *Hyper-Text Markup Language* 2.0, T. Bemers-Lee and D. Connolly, November 1995.

Figure 8:
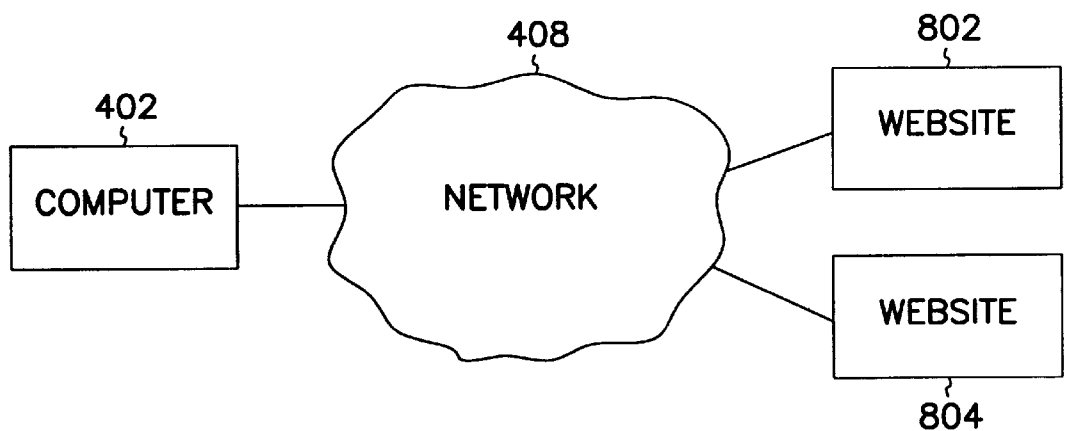
FIG. 8 is a block diagram another embodiment of the invention operating in the environment of FIG. 4

FIG. 8 shows example of the invention operating in the environment of FIG. 4. A computer user of computer 402 logs onto the Internet and communicates with an Internet web site, web site 802. The computer user registers with web site 802 thereby becoming a member of the club for web site 802. Consistent with the description for FIG. 5, web site 802 performs secure validation by reading the unique processor identification for computer 402. After validating the unique processor identification for computer 402, web site 802 sends a file (i.e., a digital membership card) back to computer 402 containing a unique membership number for computer 402 along with the unique processor identification read from the processor of computer 402. This digital membership card resides locally on computer 402.

Subsequently, the computer user of computer 402 connects with another Internet web site affiliated with web site 802, web site 804. In one embodiment, this communication between computer 402 and web site 804 occurs without communicating through or being transferred by web site 802 (i.e., the communication between computer 402 and web site 804 is independent of web site 802). Web site 804 retrieves the digital membership card from computer 402. Consistent with the description for FIG. 6, web site 804 validates the digital membership card along with the unique membership number contained therein. Moreover, web site 804 retrieves the unique processor identification and verifies that this unique processor identification matches the unique processor identification contained in the "digital membership card." Once the validation process is complete, the computer user of computer 402 is recognized as a club member allowing them to enjoy the benefits of being a member of that particular club (e.g., free or discounted items). This system of operation does not rely on the computer user entering a username and password but rather the validation process is tied to a physical aspect of the computer user's machine.

Figure 9:
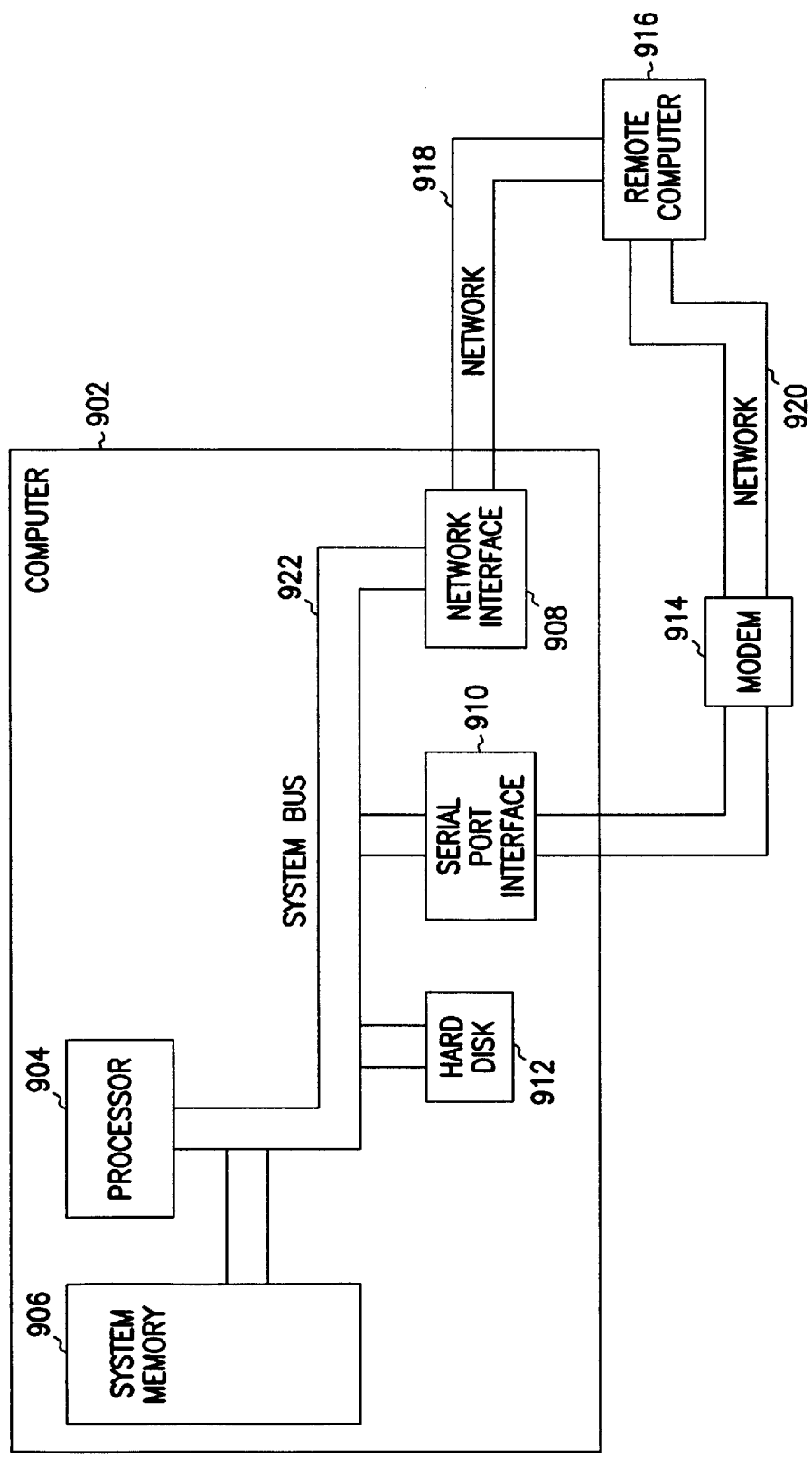
FIG. 9 is a diagram of a computer in which embodiments of the invention may be practiced.

FIG. 9 is a diagram of the hardware and operating environment of a representative computer for practicing embodiments of the invention. In particular, the computer of FIG. 9 may represent either a client or server with which embodiments of the invention may be practiced. Computer 902 includes, but is not limited to, processor 904, system memory 906, network interface 908, serial port interface 910, hard disk 912 and system bus 922. Additionally, FIG. 9 includes modem 914, remote computer 916, network 918 and network 920. System bus 922 operatively couples processor 904, system memory 906, network interface 908, serial port interface 910 and hard disk 912 of computer 902.

Moreover, computer 902 is operatively coupled to remote computer 916 through network 918 and network 920. In particular, computer 902 is operatively coupled to remote computer 916 using network 918 through network interface 908. Also computer 902 is operatively coupled to remote computer 916 using network 920 through modem 914 and serial port interface 910. System memory 906, hard disk 912, as well as floppy disks, etc., are types of computer-readable media. The invention is not particularly limited to any type of computer 902. Residing on computer 902 is a computer readable medium storing a computer program which is executed on computer 902. The use of the unique processor identification across a network is performed by the computer program is in accordance with an embodiment of the invention.

The invention includes computerized systems, methods, computers, and computer-readable media of varying scope. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof.

What is claimed is:

1. A method to provide a benefit to a user system, comprising:

the user system transmits to a first remote application an unalterable processor identification associated with the user system;

the first remote application validates the processor identification for the user system, and transmits to the user system an unalterable digital membership card containing the processor identification, where the digital membership card further contains a membership number;

the user system transmits both the processor identification and the digital membership card directly to a second remote application separate from the first remote application, without contacting the first application;

the second application validates the matches the processor identification with the processor identification in the digital membership card, and provides the benefit directly to the user system in the event of a correct match.

2. The method of claim 1 where the processor identification is a unique identifier.

3. The method of claim 1 where the digital membership card is signed as genuine by the first application.

4. A method to provide a benefit to a user system, comprising:

the user system transmits to a first remote application an unalterable processor identification associated with the user system, where the first application is a first site in a network;

the first remote application validates the processor identification for the user system, and transmits to the user system an unalterable digital membership card containing the processor identification;

the user system transmits both the processor identification and the digital membership card directly to a second remote application separate from the first remote application, without contacting the first application;

the second application validates the matches the processor identification with the processor identification in the digital membership card, and provides the benefit directly to the user system in the event of a correct match.

5. The method of claim 4 where the second application is a second site in a network.

6. The method of claim 5 where the first and second sites reside in different domains of the network.

7. The method of claim 5 where the second site is affiliated with the first site to provide the benefit.

8. The method of claim 4 where the processor identification is a unique identifier.

9. A medium containing computer-readable instructions to carry out the method of providing a benefit to a user system, comprising:

the user system transmits to a first remote application an unalterable processor identification associated with the user system;

the first remote application validates the processor identification for the user system, and transmits to the user system an unalterable digital membership card containing the processor identification;

the user system transmits both the processor identification and the digital membership card directly to a second remote application separate from the first remote application, without contacting the first application;

the second application validates the matches the processor identification with the processor identification in the digital membership card, and provides the benefit directly to the user system in the event of a correct match.

10. A method to provide a benefit to a user system, comprising:

transmitting to a first remote application an unalterable processor identification;

receiving from the first application a digital membership card validating the user system's right to receive the benefit, the card containing the processor identification in an unalterable form, where the digital membership card is signed by the first application;

transmitting both the processor identification and the digital membership card directly to a second remote application separate from the first remote application, without contacting the first application;

receiving the benefit directly from the second application if the processor identification matches the processor identification in the digital membership card.

11. The method of claim 10 where the digital membership card is signed with a public-key cryptography method.

12. The method of claim 10 where the processor identification is unique.

13. A method to provide a benefit to a user system, comprising:

transmitting to a first remote application an unalterable processor identification;

receiving from the first application a digital membership card validating the user system's right to receive the benefit, the card containing the processor identification in an unalterable form;

transmitting both the processor identification and the digital membership card directly to a second remote application separate from the first remote application, without contacting the first application;

receiving the benefit directly from the second application if the processor identification matches the processor identification in the digital membership card;

transmitting registration information to the first application.

14. The method of claim 13 further comprising receiving an agent from the first application to access the processor identification and transmit it to the first application.

15. The method of claim 13 where the processor identification is unique.

16. A medium containing computer-readable instructions to carry out the method of providing a benefit to a user system, comprising:

transmitting to a first remote application an unalterable processor identification;

receiving from the first application a digital membership card validating the user system's right to receive the benefit, the card containing the processor identification in an unalterable form;

transmitting both the processor identification and the digital membership card directly to a second remote application separate from the first remote application, without contacting the first application;

receiving the benefit directly from the second application if the processor identification matches the processor identification in the digital membership card.

17. A system for receiving a benefit from a second application, comprising:

a processor containing an unalterable identification, where the processor identification is unique;

memory coupled to the processor to hold a digital membership card signed as genuine by a first application and containing an unalterable form of the processor identification;

an agent to transmit both the processor identification and the digital membership card directly to a second application, without contacting the first application, to receive the benefit from the second application.

18. A method to provide a benefit to a user system, comprising:

receiving, at a first application, registration information and an unalterable processor identification from the user system;

registering the user system as eligible to receive the benefit from the first application;

transmitting to the user system a digital membership card authorizing a second application, remote from the first application, to provide the benefit to the user system directly, without contacting the first application, the card containing the same processor identification in another unalterable form, and further includes a unique membership number identifying the user system.

19. A method to provide a benefit to a user system, comprising:

receiving, at a first application, registration information and an unalterable processor identification from the user system;

transmitting to the user system an agent to access the processor identification and transmit it to the first application;

registering the user system as eligible to receive the benefit from the first application;

transmitting to the user system a digital membership card authorizing a second application, remote from the first application, to provide the benefit to the user system directly, without contacting the first application, the card containing the same processor identification in another unalterable form.

20. A medium containing computer-readable instructions to carry out the method of of providing a benefit to a user system, comprising:

receiving, at a first application, registration information and an unalterable processor identification from the user system;

registering the user system as eligible to receive the benefit from the first application;

transmitting to the user system a digital membership card authorizing a second application, remote from the first application, to provide the benefit to the user system directly, without contacting the first application, the card containing the same processor identification in another unalterable form.

21. A system for receiving a benefit from a second application, comprising:

a processor containing an unalterable identification;

memory coupled to the processor to hold a digital membership card signed as genuine by a first application and containing an unalterable form of the processor identification;

an agent to transmit both the processor identification and the digital membership card directly to a second application, without contacting the first application, to receive the benefit from the second application;

another agent to access the processor identification and to transmit it to the first application.

22. The system of claim 21 further including registration pages for the user to complete and transmit to the first application.

23. A method to provide a benefit to a user system, comprising:

receiving, at a first application, registration information and an unalterable processor identification from the user system;

registering the user system as eligible to receive the benefit from the first application, comprising:
  receiving registration information from the user system, and
  signing the digital membership card as genuine before transmitting it to the user system;

transmitting to the user system a digital membership card authorizing a second application, remote from the first application, to provide the benefit to the user system directly, without contacting the first application, the card containing the same processor identification in another unalterable form.

24. The method of claim 23 further comprising entering the registration information into a registration database.

25. A system to provide a benefit to a user system, comprising:

an agent to retrieve an unalterable processor identification from the user system;

a database to hold registration information;

a first application to determine from the registration database that the user system is eligible to receive the benefit;

a session manager coupled to the first application to prepare a digital membership card including the same processor identification in another unalterable form and to transmit the card to the same user system.

26. The system of claim 25 further comprising registration pages containing registration information to be transmitted to the user system for return to the registration database.

27. The system of claim 25 where the system resides at a site on a network.

28. The system of claim 27 where the site is remote from the user system.

29. A method to provide a benefit to a user system, comprising:

receiving an unalterable processor identification and a digital membership card signed as genuine by a first application and containing the processor identification in an unalterable form, directly from the user system to a second application, without passing through the first application;

receiving a request directly from the user system for the benefit;

sending an agent directly from the second application to access the digital identification from within the user system and return it directly to the second application, without contacting the first application;

matching the processor identification with the same processor identification in the membership card;

providing the benefit directly from the second application if the processor identification matches the processor identification in the digital membership card.

30. The method of claim 29 where the processor identification is unique.

31. The method of claim 29 where the agent further accesses the digital membership card within the user system, returning it directly to the second application without contacting the first application.

32. A method to provide a benefit to a user system, comprising:

receiving an unalterable processor identification and a digital membership card signed as genuine by a first application and containing the processor identification in an unalterable form, directly from the user system to a second application, without passing through the first application, where the membership card is signed in a public-key cryptography method;

matching the processor identification with the same processor identification in the membership card;

providing the benefit directly from the second application if the processor identification matches the processor identification in the digital membership card.

33. The method of claim 32 where the processor identification is unique.

34. A method to provide a benefit to a user system, comprising:

receiving an unalterable processor identification and a digital membership card signed as genuine by a first application and containing the processor identification in an unalterable form, directly from the user system to a second application, without passing through the first application, where the second application is affiliated with the first application to provide the benefit;

matching the processor identification with the same processor identification in the membership card;

providing the benefit directly from the second application if the processor identification matches the processor identification in the digital membership card.

35. The method of claim 34 where the processor identification is unique.

36. A system to provide a benefit to a user system, comprising:

a session manager to receive a request for the benefit sent directly from the user system, without contacting a first application;

an agent to access directly from the user system both an unalterable processor identification and an unalterable digital membership card containing the same processor identification and signed as genuine by the first application;

a second application to match the processor identification with the processor identification in the digital membership card, and in response to provide the benefit to the user system without contacting the first application.

37. The system of claim 36 where the system resides at a site on a network.

38. The system of claim 37 where the site is remote from the user system.

39. The system of claim 37 where the second application resides at a second site on the network, the second site being remote from the first site.

40. The system of claim 39 where the first and second sites are located in different domains of the network.

41. A medium containing computer-readable instructions to carry out the method of providing a benefit to a user system, comprising:

receiving an unalterable processor identification and a digital membership card signed as genuine by a first application and containing the processor identification in an unalterable form, directly from the user system to a second application, without passing through the first application;

matching the processor identification with the same processor identification in the membership card;

providing the benefit directly from the second application if the processor identification matches the processor identification in the digital membership card.

* * * * *